(12) United States Patent
Ioppolo et al.

(10) Patent No.: US 10,857,919 B2
(45) Date of Patent: Dec. 8, 2020

(54) LUMBAR MAT FOR A BACKREST STRUCTURE

(71) Applicant: Brose Fahrzeugteile GmbH & Co. Kommanditgesellschaft, Coburg, Coburg (DE)

(72) Inventors: Leo Ioppolo, Washington Township, MI (US); Matthew Sinke, Royal Oak, MI (US); Benjamin Brinch, Royal Oak, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 16/259,777

(22) Filed: Jan. 28, 2019

(65) Prior Publication Data

US 2020/0238868 A1   Jul. 30, 2020

(51) Int. Cl.
  *B60N 2/66* (2006.01)
  *A47C 7/46* (2006.01)
(52) U.S. Cl.
  CPC .............. *B60N 2/667* (2015.04); *A47C 7/462* (2013.01)
(58) Field of Classification Search
  CPC ............ B60N 2/667; B60N 2/66; A47C 7/462
  USPC ................................ 297/284.4, 284.5, 284.9
  See application file for complete search history.

(56) References Cited

U.S. PATENT DOCUMENTS

| 5,217,278 | A | * | 6/1993 | Harrison | B60N 2/0296 192/48.91 |
| 5,518,294 | A | * | 5/1996 | Ligon, Sr. | B60N 2/6673 297/284.4 |
| 5,651,583 | A | * | 7/1997 | Klingler | A47C 7/465 297/284.4 |
| 5,913,569 | A | * | 6/1999 | Klingler | B60N 2/66 297/284.4 |
| 5,954,399 | A | * | 9/1999 | Hong | B60N 2/6671 297/284.4 |
| 6,270,158 | B1 | * | 8/2001 | Hong | B60N 2/667 297/284.4 |
| 6,676,214 | B2 | * | 1/2004 | McMillen | B60N 2/80 297/284.1 |
| 6,692,074 | B1 | * | 2/2004 | Kopetzky | B60N 2/6671 297/284.4 |
| 6,758,522 | B2 | * | 7/2004 | Ligon, Sr. | A47C 7/46 297/284.4 |

(Continued)

*Primary Examiner* — Mark R Wendell
(74) *Attorney, Agent, or Firm* — Lewis Roca Rothgerber Christie LLP

(57) ABSTRACT

A lumbar mat for a backrest structure for use in a vehicle seat, the lumbar mat adapted to be arranged between a lumbar support structure and a backrest cushion of the backrest structure, including a front surface adapted to face towards a backrest cushion of a backrest structure, when the lumbar mat is arranged in the backrest structure, a plurality of first spring elements arranged at the front surface of the lumbar mat, each of the first spring elements adapted to apply a first elastic force towards the backrest cushion via a first contact area of the first spring element, respectively, and a plurality of second spring elements, each of the second spring elements associated with a respective one of the plurality of first spring elements and adapted to apply a second elastic force towards the backrest cushion via a second contact area of the second spring element, respectively.

10 Claims, 4 Drawing Sheets

(56) References Cited

U.S. PATENT DOCUMENTS

| | | | | |
|---|---|---|---|---|
| 8,020,933 B2* | 9/2011 | Kim | ............... | B60N 2/66 |
| | | | | 297/284.8 |
| 8,038,215 B2* | 10/2011 | Di Giusto | ............ | B60N 2/6671 |
| | | | | 297/284.1 |
| 8,684,460 B2 | 4/2014 | Weir, III | | |
| 9,254,768 B2* | 2/2016 | Hong | ............... | B60N 2/6673 |
| 10,299,602 B2* | 5/2019 | Wu | ............... | A47C 7/004 |
| 2003/0071501 A1* | 4/2003 | Cruz Fernandes de Pinho ........... | | |
| | | | | B60N 2/6671 |
| | | | | 297/284.4 |
| 2004/0160099 A1* | 8/2004 | Hong | ............ | B60N 2/666 |
| | | | | 297/284.4 |
| 2010/0033002 A1* | 2/2010 | Di Giusto | ............ | B60N 2/6671 |
| | | | | 297/284.2 |
| 2010/0301650 A1* | 12/2010 | Hong | ............ | B60N 2/66 |
| | | | | 297/284.8 |
| 2013/0341982 A1* | 12/2013 | Maierhofer | ............ | B60N 2/666 |
| | | | | 297/284.4 |

\* cited by examiner

LUMBAR MAT FOR A BACKREST STRUCTURE

FIELD OF THE INVENTION

The present disclosure relates to lumbar mats and more particularly to lumbar mats for backrest structures of vehicle seats.

BACKGROUND OF THE INVENTION

Backrests of vehicle seats often provide an adjustable lumbar support. In many cases, a curvature of the backrest in the lumbar portion may be manually or automatically adjusted to a user's need or preference. For this purpose, a backrest may comprise a backrest frame supporting a backrest cushion as well as a lumbar support structure, which is mounted on the front side of the backrest frame behind the backrest cushion for supporting the back of a user. The lumbar support structure may comprise an adjusting device for adjusting the position of the lumbar support perpendicular to a plane of the backrest frame.

In typical implementations, a flexible lumbar mat is arranged on the front side of the backrest frame between the lumbar support structure and the backrest cushion. For example, the flexible lumbar mat may serve for transmitting a supporting force from the adjusting device towards the lumbar portion of the backrest cushion, wherein the lumbar mat provides a curved surface of the lumbar support. An example of a backrest structure with an adjustable lumbar support is described in the patent document U.S. Pat. No. 8,684,460 B2.

SUMMARY OF THE INVENTION

According to one embodiment, a lumbar mat for a backrest structure for use in a vehicle seat is adapted to be arranged between a lumbar support structure and a backrest cushion of the backrest structure, and includes a front surface adapted to face towards a backrest cushion of a backrest structure, when the lumbar mat is arranged in the backrest structure, a plurality of first spring elements arranged at the front surface of the lumbar mat, each of the first spring elements adapted to apply a first elastic force towards the backrest cushion via a first contact area of the first spring element, respectively, and a plurality of second spring elements, each of the second spring elements associated with a respective one of the plurality of first spring elements and adapted to apply a second elastic force towards the backrest cushion via a second contact area of the second spring element, respectively. For each of the plurality of first spring elements and a respective second spring element associated with the first spring element, a stiffness of the first spring element is greater than a stiffness of the second spring element, and the second spring element is adapted to, in a relaxed state of the first spring element and the second spring element, extend further from the front surface of the lumbar mat and towards a position of the backrest cushion than the first spring element.

In some implementations of the lumbar mat, for each of the plurality of first spring elements and a second spring element associated with the first spring element a distance between the first contact area and the second contact area is 8 cm or less, preferably 5 cm or less.

In some implementations, the lumbar mat comprises flexible material. In one or more embodiments, each of the plurality of first spring elements and each of the plurality of second spring elements is formed as a flexible member integral to the lumbar mat.

In some implementations, each of the plurality of first spring elements comprises a protrusion which extends laterally from one of two opposite side portions of the lumbar mat. Preferably, for at least one of the plurality of first spring elements and a second spring element associated with the first spring element the second spring element extends from the first spring element. In some of these implementations, the second spring element extends from the first contact area of the first spring element. In some implementations, the second spring element extends in a different direction than the first spring element. In further implementations, the second spring element extends in a same lateral direction as the first spring element.

According to another embodiment, a backrest structure for use in a vehicle seat comprises a lumbar support structure, a backrest cushion, and a lumbar mat arranged between the lumbar support structure and the backrest cushion. The lumbar mat includes a front surface adapted to face towards a backrest cushion of a backrest structure, when the lumbar mat is arranged in the backrest structure, a plurality of first spring elements arranged at the front surface of the lumbar mat, each of the first spring elements adapted to apply a first elastic force towards the backrest cushion via a first contact area of the first spring element, respectively, and a plurality of second spring elements, each of the second spring elements associated with a respective one of the plurality of first spring elements and adapted to apply a second elastic force towards the backrest cushion via a second contact area of the second spring element, respectively. For each of the plurality of first spring elements and a respective second spring element associated with the first spring element, a stiffness of the first spring element is greater than a stiffness of the second spring element, and the second spring element is adapted to, in a relaxed state of the first spring element and the second spring element, extend further from the front surface of the lumbar mat and towards a position of the backrest cushion than the first spring element.

BRIEF DESCRIPTION OF THE DRAWINGS

Further features and advantages of the invention will now be explained in the following detailed description with reference to the drawings.

DETAILED DESCRIPTION OF THE INVENTION

Due to the required deformability of the lumbar mat in accordance with different adjustments of the lumbar support, the lumbar mat is rather freely supported by the lumbar support structure, often merely hanging from a wire frame sandwiched between the lumbar support structure and the backrest cushion. However, frequent use of the backrest may cause permanent deformation of the backrest cushion. Moreover, an elasticity of the backrest cushion may deteriorate over time. As a consequence, the lumbar mat may no longer be firmly clamped between the lumbar support structure and the backrest cushion, but empty space may form in which the lumbar mat can move, especially when the seat is not used. Movements of the lumbar mat may occur, for example, in a front passenger seat as a result of vehicle movements and vibrations. This in turn may give rise to undesirable rattling noise or poor buzz, squeak and rattle (BSR) characteristics of the vehicle resulting from a rattling lumbar mat.

It is thus an object of the present invention to improve a backrest structure of the type mentioned with regard to the minimization of rattling noises caused by a lumbar mat.

Figure 1:
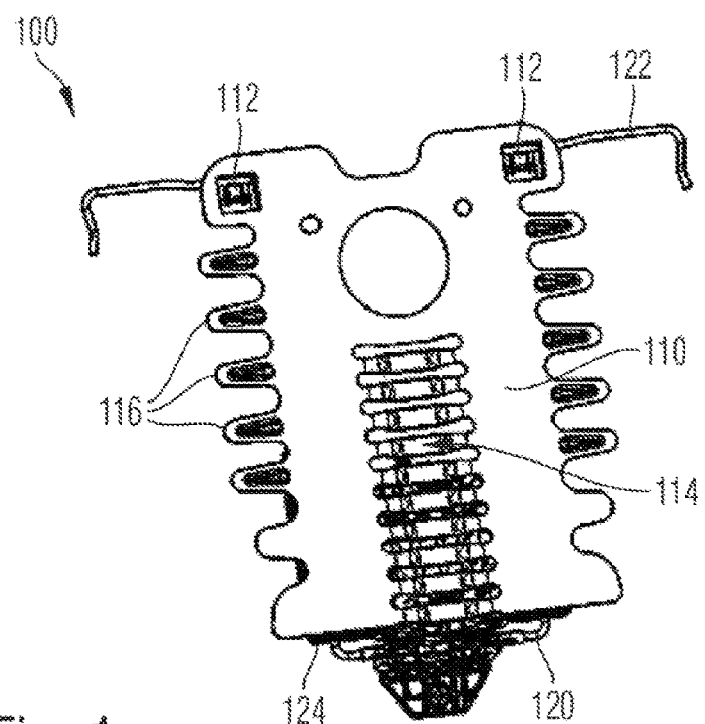
FIG. 1 is a perspective view of a backrest structure for a vehicle seat not showing a backrest cushion.

FIG. 1 shows schematically an exemplary backrest structure 100 for a seat. The backrest structure 100 may be adapted to be arranged at the front side of a backrest frame (not shown). The backrest structure 100 may include a lumbar mat 110 that may be attached to a lumbar support structure 120 and that may be arranged behind a backrest cushion (not shown) of a backrest structure. The lumbar support structure 120 may include a wire frame 122 as well as an adjusting device 124 attached to the wire frame 122 and adapted to act on the lumbar mat 110, for adjusting a curvature or a position of the lumbar mat 110.

The lumbar mat 110 is attached to the frame 122, for example, in a hanging manner, by fixation means 112. In some examples, each of the fixation means 112 comprises a clamp, a clip, a hook, or the like. The adjusting device 124 is arranged behind the lumbar mat 110 and is adapted to change a position of at least a portion of the lumbar mat 110 perpendicular to an extension plane of the frame 122, in accordance with a manual or automatic adjustment operation of the adjusting device 124. The lumbar mat 110 comprises flexible material, such as flexible plastic, and is adapted to exhibit a curvature in accordance with the position of the adjusting device 124 acting on the lumbar mat 110.

The lumbar mat 110 comprises in a central region a spinal recess portion 114. The spinal recess portion 114 forms a recess relative to the front surface of the lumbar mat 110. The spinal recess portion 114 thereby allows avoidance of undesirable pressure points forming through the backrest cushion between the lumbar mat 110 and a user's spine.

The lumbar mat 110 further comprises on each side a plurality of lateral protrusions 116. The protrusions 116 increase the width of a contact area of the lumbar mat 110 relative to the backrest cushion. In some examples, the protrusions 116 are formed as flexible elements which provide elastic support for the backrest cushion.

Figure 2A:
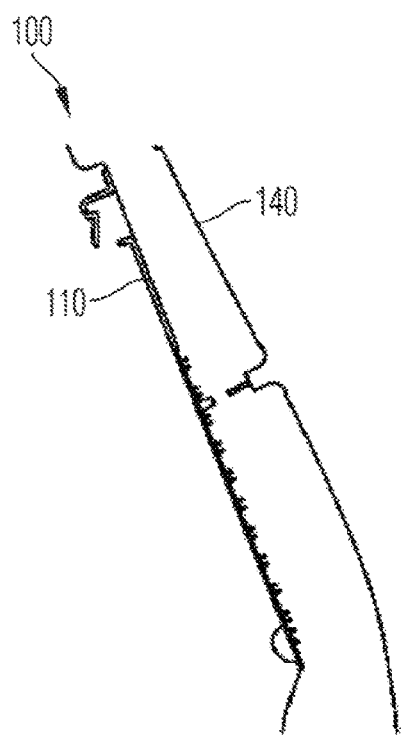
FIGS. 2A-2B are side views of a backrest structure at different positions of the backrest cushion.
Figure 2B:
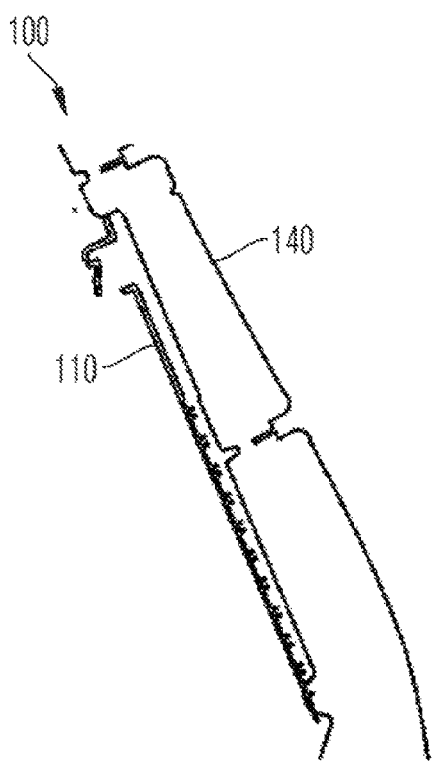

FIGS. 2A-2B the show schematically and exemplarily a side view of a backrest structure 100, for example, the backrest structure 100 of FIG. 1, at different states of a backrest cushion.

FIG. 2A shows the backrest structure 100 with a lumbar mat 110 and a backrest cushion 140 (lumbar support structure not shown), wherein the backrest cushion 140 is in contact with the lumbar mat 110. The position of the backrest structure 100 as shown in FIG. 2A corresponds to an ideal position in which the lumbar mat 110 is in contact with the backrest cushion 140 in such a manner that a position of the lumbar mat 110 relative to the backrest cushion 140 is fixed.

FIG. 2B shows a backrest structure 100 similar to the one of FIG. 2A. However, in the example of FIG. 2B the backrest cushion 140 is in a different state, especially in a different position relative to the lumbar mat 110. In the state shown, a gap is formed between the lumbar mat 110 and the backrest cushion 140, essentially over the entire height of the lumbar mat 110. In this position, the lumbar mat 110 is not firmly sandwiched between the backrest cushion 140 and the lumbar support structure (not shown). Instead, the flexible lumbar mat 110 has space to move relative to the backrest cushion 140, for example, as a result of vehicle movements or vibrations. This can lead to rattling or other disturbing noise.

A situation as shown in FIG. 2B may arise, for example, in case of a permanent deformation of the backrest cushion 140 in consequence of frequent use or a reduced elasticity of the backrest cushion 140 over time. Moreover, a gap between the lumbar mat 110 and the backrest cushion 140 as shown in FIG. 2B is likely to occur when the seat is unused, as in that case the backrest 140 is not pressed towards the lumbar support structure by the weight of a user.

Figure 3:
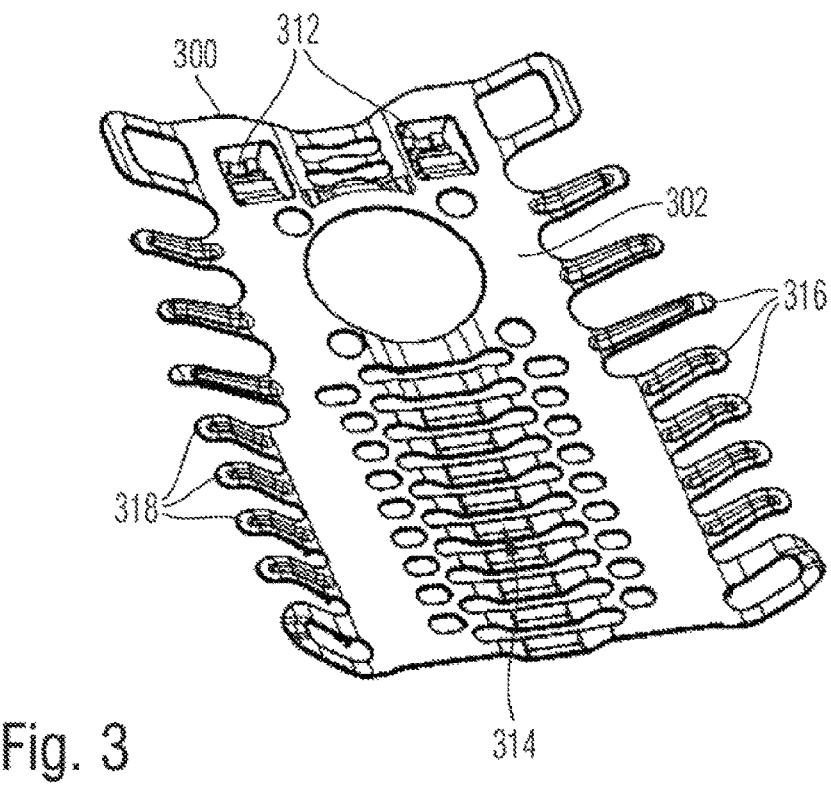
FIG. 3 is a perspective view of a lumbar mat.

FIG. 3 shows schematically and exemplarily a perspective view of a lumbar mat 300. Unless otherwise clear from the following, the preceding discussion of the lumbar mat 110 of FIG. 1 applies correspondingly to the lumbar mat 300. In particular, in some examples the lumbar mat 300 is adapted to be used in connection with a backrest structure as described in connection with FIG. 1, in place of the lumbar mat 110, Similar to the lumbar mat 110, the lumbar mat 300 may include one or more fixation features, such as fixation recesses 312, a spinal recess portion 314 formed of one or more recesses defined by a front surface plane 302 of the lumbar mat 300, and a plurality of lateral protrusions 316 extending from either side of the lumbar mat 300.

In the lumbar mat 300 each of the lateral protrusions 316 is bent relative to the front surface plane 302 of the lumbar mat 300, in a direction towards an envisaged position of a backrest cushion. At the outer end of each of the protrusions 316 a contact area 318 is formed for mechanical contact with the backrest cushion.

The protrusions 316 are flexible so as to elastically deform, for example, when the weight of a user occupying the seat exerts a force on the backrest cushion that is transferred to the contact areas 318. In that way, an adaptation of the backrest cushion to the front surface plane 302 of the lumbar mat 300, including a curvature of the front surface plane 302, is enabled when the seat is used. When the seat is unused, the protrusions 316 may revert to their relaxed positions as shown in FIG. 3. In this manner, in the case that a gap similar to the gap shown in FIG. 2B has formed between the backrest cushion and the front surface plane 302 of the lumbar mat 300, the protrusions 316 may increase contact between the lumbar mat 300 and the backrest cushion at the contact areas 318. By exerting a biasing force, the lumbar mat 300 and the backrest cushion may position and retain the lumbar mat 300 in a fixed position between the lumbar support structure and the backrest cushion, thereby avoiding undesired movement of the lumbar mat 300.

A disadvantage of the lumbar mat 300 of FIG. 3 has been found in that the protrusions 316 and the biasing force which they exert via the contact areas 318 tend to produce noticeable pressure points. Such pressure points may negatively affect a user's experience.

Figure 4:
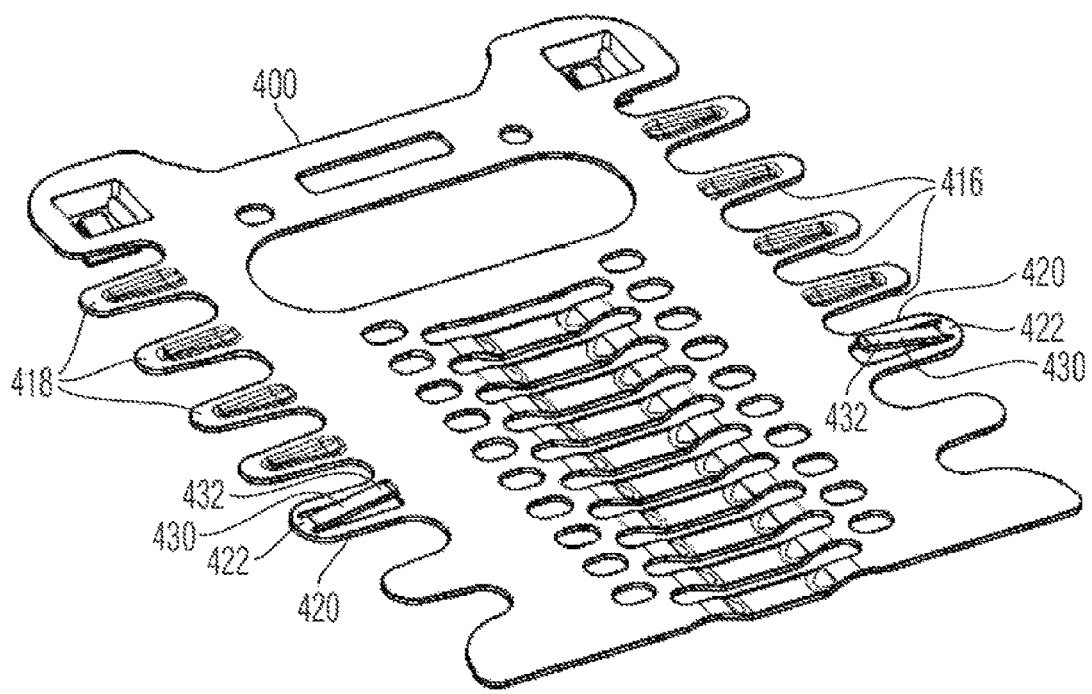
FIG. 4 is a perspective view of a lumbar mat according to another plementation.

FIG. 4 shows schematically and exemplary a perspective view of a lumbar mat 400. Unless otherwise clear from the following, the preceding discussion of the lumbar mat 300 of FIG. 3 applies correspondingly to the lumbar mat 400.

The lumbar mat 400 has been configured to avoid noticeable pressure points in connection with lateral protrusions. Similar to the previous examples, the lumbar mat 400 may include one or more lateral protrusions 416, 420 that may extend from either side of the lumbar mat 400. Moreover, each of the protrusions 416, 420 may include a contact area 418, 422 that may be configured to contact a backrest cushion.

In one or more embodiments, a number of the protrusions 420 of the lumbar mat 400 may be configured as first spring elements adapted to apply a first elastic force towards the backrest cushion via first contact areas 422, whereas associated with each first spring element 420 a second spring element 430, such as, a biased tab, is provided. Each of the second spring elements 430 may be configured to apply a second elastic force towards the backrest cushion when force is applied to the backrest cushion and second contact area 432 of the second spring element 430 contacts the backrest cushion.

The first spring elements 420 and the second spring elements 430 may be configured such that a stiffness of the first spring elements 420 may be greater than a stiffness of the second spring elements 430. For example, a spring constant associated with an elastic deformation of the first spring elements 420 may be greater than a spring constant associated with an elastic deformation of the second spring elements 430. Moreover, as shown in FIG. 4, when the first spring elements 420 and the second spring elements 430 are in a relaxed position, the second spring elements 430 are arranged to extend further from the front surface plane of the lumbar mat 400 towards an envisaged position of the backrest cushion than the first spring elements 420.

If the lateral protrusions 420 are stiffer or have a greater stiffness than the biased tabs 430, the biased tabs 430 may deform prior to deformation of the lateral protrusions 420.

The amount that first spring elements 420 may extend away from the front surface plane of the lumbar mat 400 may be less than in the case of the lumbar mat 300. Accordingly, while a gap as shown in FIG. 2B has not yet formed, for example, due to the use of a new backrest cushion, mechanical stress exerted on the backrest cushion may be reduced. At the same time, the stiffness of the second spring elements 430 may be chosen such that it is sufficient for holding the lumbar mat 400 in position even if there is a larger gap between the lumbar mat 400 and the backrest cushion.

Furthermore, in the case that the first spring elements 420 and the second spring elements 430 are deformed simultaneously by the weight of a user of the seat, the addition of the second spring elements 430 may increase contact regions formed by the first contact areas 422 and the second contact areas 432. This may mitigate or avoid pressure points. In addition, the stiffness of the first spring elements 420 and of the second spring elements 430 may be altered to adjust the distributions of pressure between the first contact areas 422 and the second contact areas 432.

In the shown example, the first and second spring elements 420, 430 are configured such that the distance between the first contact areas 422 and the associated second contact areas 432 is 8 cm or less, for example, 5 cm or less. In some examples, a distance between the first and the second contact areas 422, 432 is chosen in accordance with at least one of a total amount of spring elements 420, 430, a size of the spring elements 420, 430, including, for example, a length of the first spring element 420 and a length of the second spring element 430, or a density of an arrangement of spring elements 420, 430.

The lumbar mat 400 may be made of flexible material, for example flexible plastic, which exhibits an elastic deformation behavior. In the shown example, the first spring elements 420 and the second spring elements 430 are integrally formed with the central area of the lumbar mat 400. Integrally forming the lumbar mat 400, first spring elements 420, and second spring elements 430 as one piece may reduce the number of different materials and quantity of parts necessary for manufacturing.

In the shown example, the second spring element 430 may extend from the first spring element 420, such as from the first contact area 422 of the first spring element 420, and in a lateral direction opposite to an extension direction of the first spring element 420. However, in other examples different arrangements or extension directions of the first spring elements 420 and the second spring elements 430 may be implemented. Additionally, the first spring elements 420 and the second spring elements 430 may be arranged in a stacked or serial arrangement, so that the first spring elements 420 and the associated second spring elements 430 act on each other. However, in other examples the first spring elements 420 and the second spring elements 430 may be formed separate and be functionally independent from each other.

Figure 5:
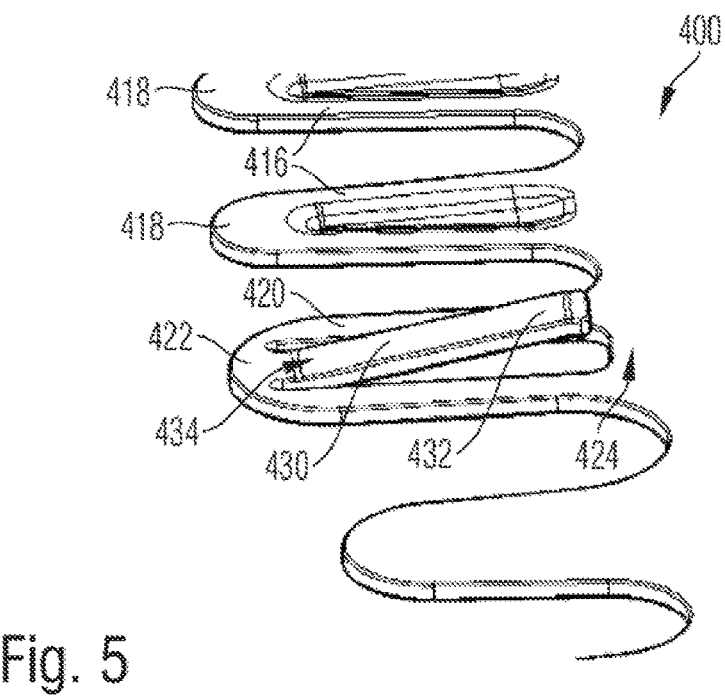
FIG. 5 shows an enlarged detail of he lumbar mat of FIG. 4.

FIG. 5 shows a detail of the lumbar mat 400 of FIG. 4. The first spring element 420 may extend from a side portion of the lumbar mat 400 and be connected by a first bending portion 424, Similarly, the second spring element 430 may extend from the first spring element 420, to which it is connected by a second bending portion 434. The stiffness of each of the first and second spring elements 420, 430 may a function of the geometry of the bending portions 424, 434, a material thickness of one or more regions of the first and second spring elements 420, 430 or bending portions 424, 434, for example.

Figure 6:
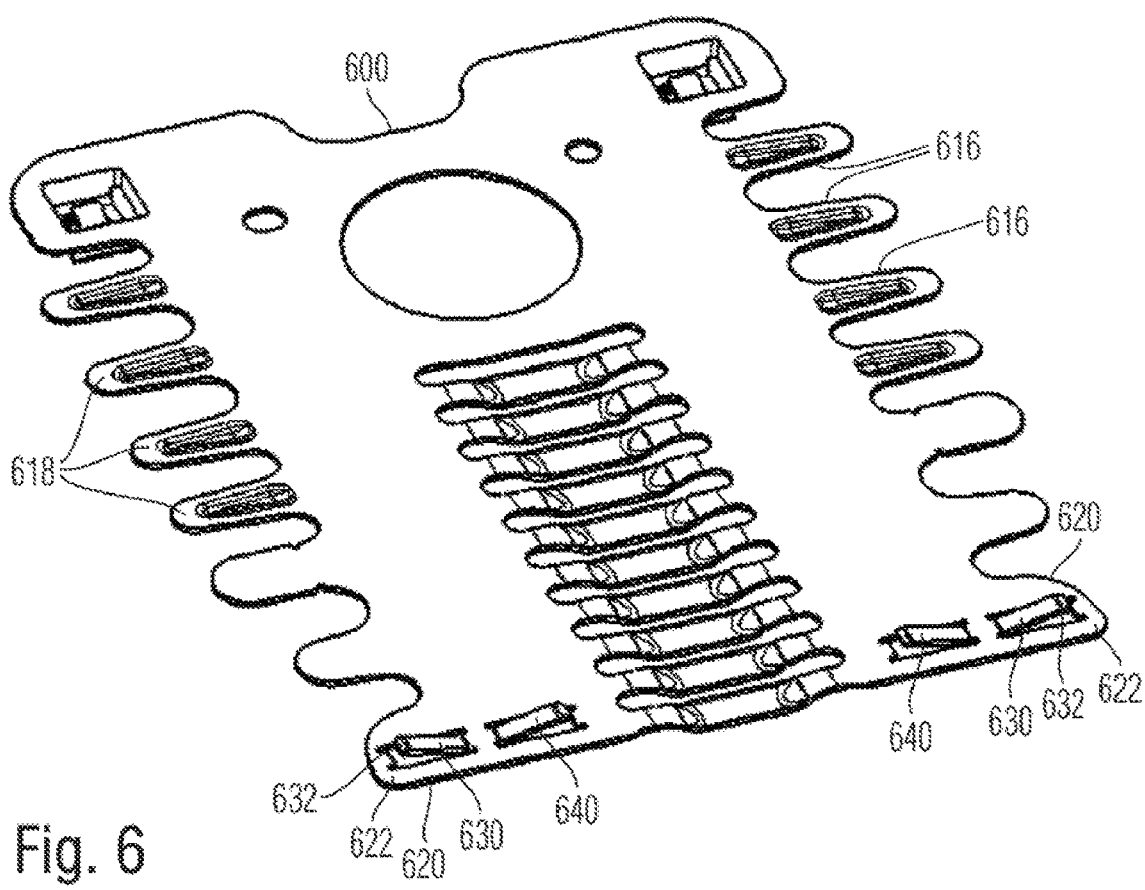
FIG. 6 is a perspective view of a lumbar mat according to yet another implementation.

FIG. 6 shows schematically and exemplarily a perspective view of a lumbar mat 600. Unless otherwise clear from the following, the preceding discussion of the lumbar mat 400 of FIG. 4 applies correspondingly to the lumbar mat 600. In particular, the lumbar mat 600 also comprises a plurality of lateral protrusions 616, 620 adapted to contact a backrest cushion at contact areas 618, 622. Moreover, at least two of the lateral protrusions 620 are formed to constitute first spring elements having first contact areas 622, while associated with each first spring element 620 is a second spring element 630 having a second contact area 632.

Regarding the functionality of the first and second spring elements 620, 630, the preceding discussion of the first and second spring elements 420, 430 applies correspondingly. However, different from the example shown in FIGS. 4 and 5 the second spring elements 630 are arranged to extend in the same direction as the respective first spring element 620. Moreover, as shown in FIG. 6, additional spring elements 640 similar to the second spring elements 630 may be arranged at various places and with arbitrary orientations at the front surface of the lumbar mat 600.

Figure 7:
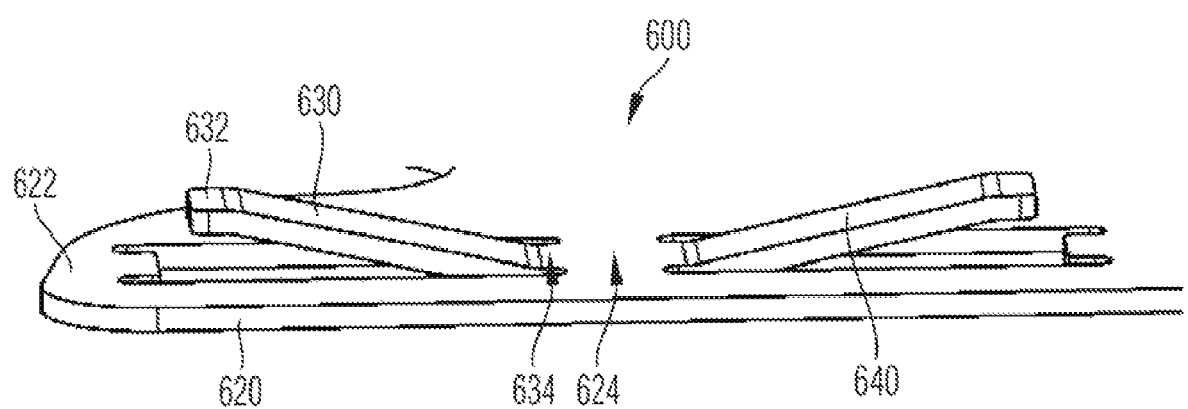
FIG. 7 shows an enlarged detail of the lumbar mat of FIG. 6.

FIG. 7 shows a detail of the lumbar mat 600 of FIG. 6. The detail shows the first spring element 620 extending from a first bending portion 624, and the second spring element 630 extending from the second bending portion 634. In the shown example, the second bending portion 634 lies within the first spring element 620. However, in other examples the first and second bending portions 624, 634 are arranged such that the second bending portion 634 lies outside the first spring element 620. In some of these examples, a local stiffness of the lumbar mat 600 is adapted such that a bending of the first spring element 620 occurs near an exterior portion of the protrusion forming the first spring element 620.

In the examples of FIGS. 4-7, only some of the lateral protrusions comprise a first and a second spring element. However, in other examples of the described lumbar mats more than the shown amount of protrusions are configured to comprise first and second spring elements, as described herein. Moreover, in further examples, associated pairs of first and second spring elements as herein described are arranged at other places of the respective lumbar mat and in forms other than lateral protrusions.

What is claimed is:

1. A lumbar mat for a backrest structure for use in a vehicle seat, the lumbar mat adapted to be arranged between a lumbar support structure and a backrest cushion of the backrest structure, the lumbar mat comprising:
   a front surface adapted to face towards a backrest cushion of a backrest structure when the lumbar mat is arranged in the backrest structure;
   a plurality of first spring elements arranged at the front surface of the lumbar mat, each of the first spring elements adapted to apply a first elastic force towards the backrest cushion via a first contact area of the first spring element, respectively, and
   a plurality of second spring elements, each of the second spring elements associated with only a respective one of the plurality of first spring elements and adapted to apply a second elastic force towards the backrest cushion via a second contact area of the second spring element, respectively,
   wherein, for each of the plurality of first spring elements and a respective second spring element associated with the first spring element:
   a stiffness of the first spring element is greater than a stiffness of the second spring element, and
   the second spring element, in a relaxed state of the first spring element and of the second spring element, extends further from the front surface of the lumbar mat and towards a position of the backrest cushion than the first spring element.

2. The lumbar mat according to claim 1, wherein the lumbar mat comprises flexible material.

3. The lumbar mat according to claim 1, wherein each of the plurality of first spring elements and each of the plurality of second spring elements is formed integral to the lumbar mat.

4. The lumbar mat according to claim 1, wherein each of the plurality of first spring elements is a protrusion which extends laterally from one of two opposite side portions of the lumbar mat.

5. The lumbar mat according to claim 1, wherein, for at least one of the plurality of first spring elements and the second spring element associated with the first spring element, the second spring elements extends from the first spring element.

6. The lumbar mat according to claim 5, wherein the second spring element extends from the first contact area of the first spring element.

7. The lumbar mat according to claim 6, wherein the second spring element extends in a different direction than the first spring element.

8. The lumbar mat according to claim 5, wherein the second spring element extends in a same lateral direction as the first spring element.

9. The lumbar mat of claim 1, wherein, for each of the plurality of first spring elements and a second spring element associated with the first spring element, a distance between the first contact area and the second contact area is 8 cm or less.

10. A backrest structure for use in a vehicle seat, comprising a lumbar support structure, a backrest cushion, and a lumbar mat arranged between the lumbar support structure and the backrest cushion, the lumbar mat comprising:
    a front surface adapted to face towards a backrest cushion of a backrest structure when the lumbar mat is arranged in the backrest structure;
    a plurality of first spring elements arranged at the front surface of the lumbar mat, each of the first spring elements adapted to apply a first elastic force towards the backrest cushion via a first contact area of the first spring element, respectively, and
    a plurality of second spring elements, each of the second spring elements associated with only a respective one of the plurality of first spring elements and adapted to apply a second elastic force towards the backrest cushion via a second contact area of the second spring element, respectively,
    wherein, for each of the plurality of first spring elements and a respective second spring element associated with the first spring element:
    a stiffness of the first spring element is greater than a stiffness of the second spring element, and
    the second spring element, in a relaxed state of the first spring element and of the second spring element, extends further from the front surface of the lumbar mat and towards a position of the backrest cushion than the first spring element.

* * * * *